United States Patent
Chew et al.

(10) Patent No.: US 10,991,284 B2
(45) Date of Patent: Apr. 27, 2021

(54) METHOD FOR COLOR CALIBRATING MULTIPLE DISPLAYS AND SYSTEM THEREFOR

(71) Applicant: DELL PRODUCTS, LP, Round Rock, TX (US)

(72) Inventors: Choon Keat (Alex) Chew, Pulau Pinang (MY); Wei Wei Wilson Chua, Singapore (SG); Chih-Hao (Gisir) Kao, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 16/545,258

(22) Filed: Aug. 20, 2019

(65) Prior Publication Data
US 2021/0056877 A1    Feb. 25, 2021

(51) Int. Cl.
*G09G 3/00* (2006.01)
*F16M 11/22* (2006.01)

(52) U.S. Cl.
CPC ............ *G09G 3/006* (2013.01); *F16M 11/22* (2013.01); *G09G 2320/0666* (2013.01); *G09G 2320/0686* (2013.01); *G09G 2320/0693* (2013.01)

(58) Field of Classification Search
CPC ...................................................... G09G 3/006
USPC ...................................................... 345/589
See application file for complete search history.

(56) References Cited

U.S. PATENT DOCUMENTS

| | | | |
|---|---|---|---|
| 2010/0289783 A1 | 11/2010 | Leppla | |
| 2015/0124002 A1* | 5/2015 | Horikawa | G09G 3/3607 345/690 |
| 2015/0243251 A1* | 8/2015 | Ohnishi | G09G 5/12 345/690 |
| 2017/0270896 A1 | 9/2017 | Cope et al. | |
| 2019/0096300 A1 | 3/2019 | Lin et al. | |

* cited by examiner

*Primary Examiner* — David T Welch
(74) *Attorney, Agent, or Firm* — Larson Newman, LLP (57) ABSTRACT

A system includes a monitor stand configured to mount two or more display devices. The monitor stand includes an extension arm having an integral color calibration device. The extension arm can be manipulated to selectively position the color calibration device in contact with a light-emitting portion of each display device, and can be collapsed for stowage adjacent to the monitor stand. The system further controls the color calibration device to determine initial color attributes of each display device.

20 Claims, 12 Drawing Sheets

METHOD FOR COLOR CALIBRATING MULTIPLE DISPLAYS AND SYSTEM THEREFOR

FIELD OF THE DISCLOSURE

This disclosure generally relates to information handling systems, and more particularly relates to color calibration of multiple displays.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A system may include a monitor stand configured to mount two or more display devices. The monitor stand includes an extension arm having an integral color calibration device. The extension arm can be manipulated to selectively position the color calibration device in contact with a light-emitting portion of each display device, and can be collapsed for stowage adjacent to the monitor stand. The system further includes a processor to control the color calibration device to determine initial color attributes of each display device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
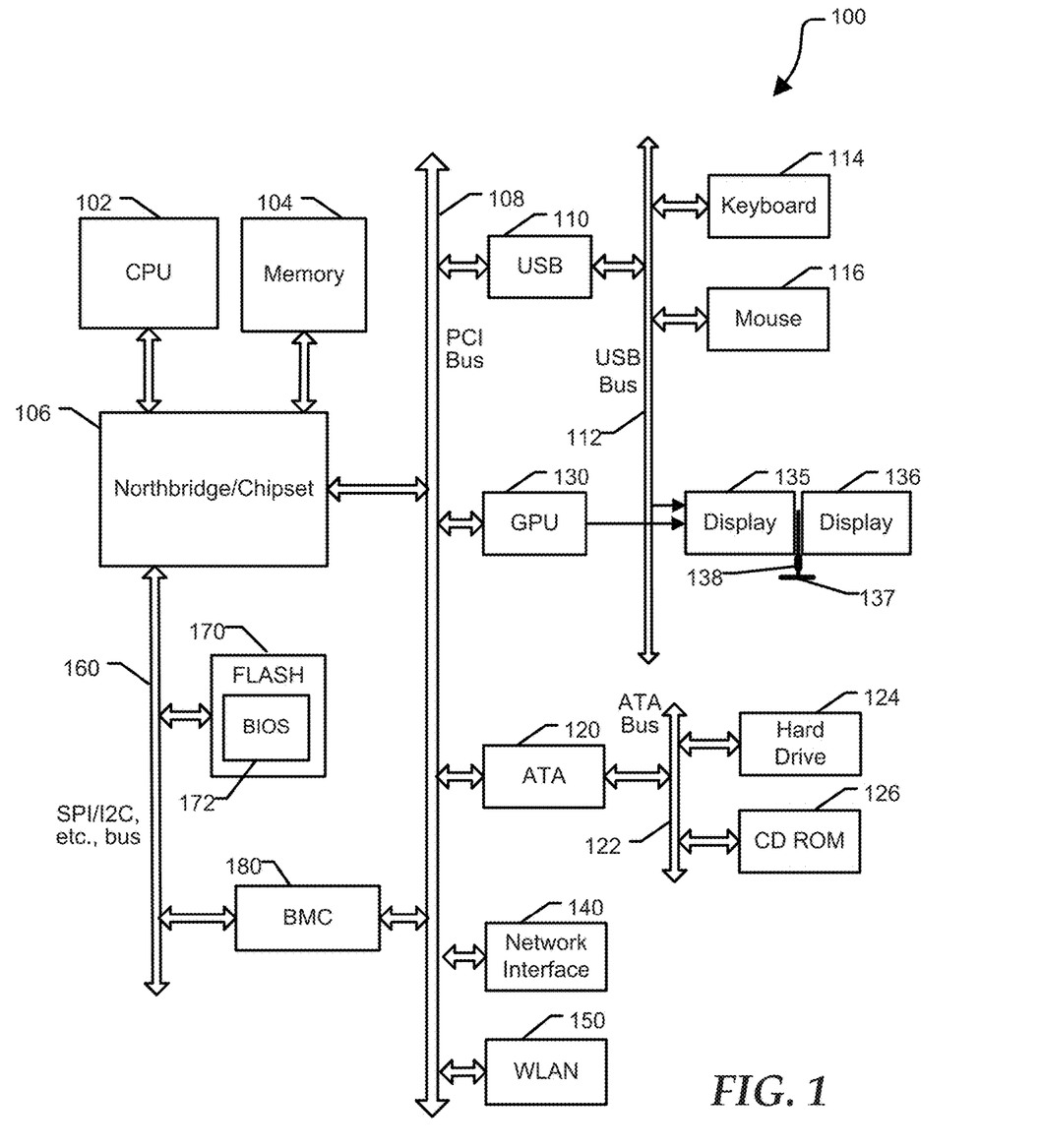
FIG. 1 is a block diagram of an information handling system according to an embodiment of the present disclosure.

FIG. 1 shows an information handling system 100 including a processor 102, a memory 104, a chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a graphics processing unit (GPU) 130 coupled to display device 135 and to display device 136, a monitor stand 137 including an integral color calibration assembly 138, a network interface controller (NIC) 140, a wireless local area network (WLAN) controller 150, a serial peripheral interface (SPI) bus 160, a first flash memory device 170 for storing BIOS code 172, and a baseboard management controller (BMC) 180. BMC 180 can be referred to as a service processor, and embedded controller (EC), and the like. The terms BMC and EC are interchangeable with regard to the present disclosure. Flash memory device 170 can be referred to as a SPI flash device, BIOS SPI, and the like. BMC 180 is configured to provide out-of-band and/or side-band access to devices at information handling system 100. As used herein, out-of-band access herein refers to operations performed without support of CPU 102, such as prior to execution of BIOS code 172 by processor 102 to initialize operation of system 100.

Information handling system 100 can include additional components and additional buses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard and a mouse.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS code 172 includes instructions executable by CPU 102 to initialize and test the hardware components of system 100, and to load a boot loader or an operating system (OS) from a mass storage device. BIOS code 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, the BIOS code 172 can be substantially compliant with one or more revisions of the UEFI specification.

Color calibration is a requirement for display devices utilized in a color-managed workflow, such as displays used for photo-processing and video production. Color calibration refers to the process of adjusting the full range of colors that can be rendered at the display device. The gamut of a display device refers to the portion of a color space that can be represented. For calibrating a display, a colorimeter is typically positioned in contact with the display's surface. Calibration software sends a series of color signals to the display and compares the values that were actually sent against the readings from the calibration device. This establishes the current offsets in color display. Depending on the calibration software and capabilities of the display device, the software can introduce color compensation according to the measured offsets. For example, some display devices include the capability to upload a customized color map into the display's firmware. Alternatively, the operating system (OS) may support a correction matrix, such as an International Color Consortium (ICC) profile, that adjust color values based on the measured offsets before being sent to the display. Finally, most display devices provide an on-screen display (OSD) interface for altering the display's brightness/contrast and RGB or white-level values, and the calibration software can issue OSD commands to attempt to compensate for the measured offsets. Either method can be used to tune the display to more accurately reproduce the in-gamut part of a desired color space.

Typically, a color calibration process only allows for calibration of one display to a reference color gamut. As disclosed herein, monitor stand 137 provides an integral color calibration assembly 138 that includes an extension arm and a color calibration sensor. The extension arm includes a root-end attached to the monitor stand. In an embodiment, the extension arm can be collapsed for stowage adjacent to the monitor stand, such as within a recess provided at monitor stand 137. During use, the extension arm can be manually or automatically withdrawn from the stowed position and manipulated to position the calibration sensor against the light-emitting portion of the one or more display devices attached to monitor stand 137. In an embodiment, calibration software executing at information handling system 100 can be configured to sequentially calibrate each display device for optimal rendition of a desired color space. In another embodiment, the software can be used to calibrate two or more display devices so that the color and brightness of each display device is as similar as possible given the particular capabilities of each display device, referred to herein as color matching.

To start color calibration or color matching for two or more displays, the user can extend the extension arm out to the first display device. The extension arm is in an enabled state and power is provided to the color calibration sensor. The user positions the color calibration sensor on a predetermined position at the front-of-screen (FOS) area of the first display device. Video information can be generated by information handling system 100 and provided to each display device by a video display interconnect, such as Display Port (DP), High Definition Multimedia Interface (HDMI), and the like. The user then initiates the color calibration and color matching software at information handling system 100. Through this software, the user can choose a desired color calibration or color matching process. The software can first detect the model and capabilities of the first display device. Next, test images are provided to the first display device and measurements corresponding to each test image that are received from the color calibrator sensor are transmitted back to the software. The software then compute the necessary changes to either the whole color map or to the settings of color temperature, brightness and contrast. The software then informs the user to move the extension arm to the next display device and initiates color calibration or a color matching process at the second display device. The process will end when the target displays are color calibrated or color matched.

Figure 2:
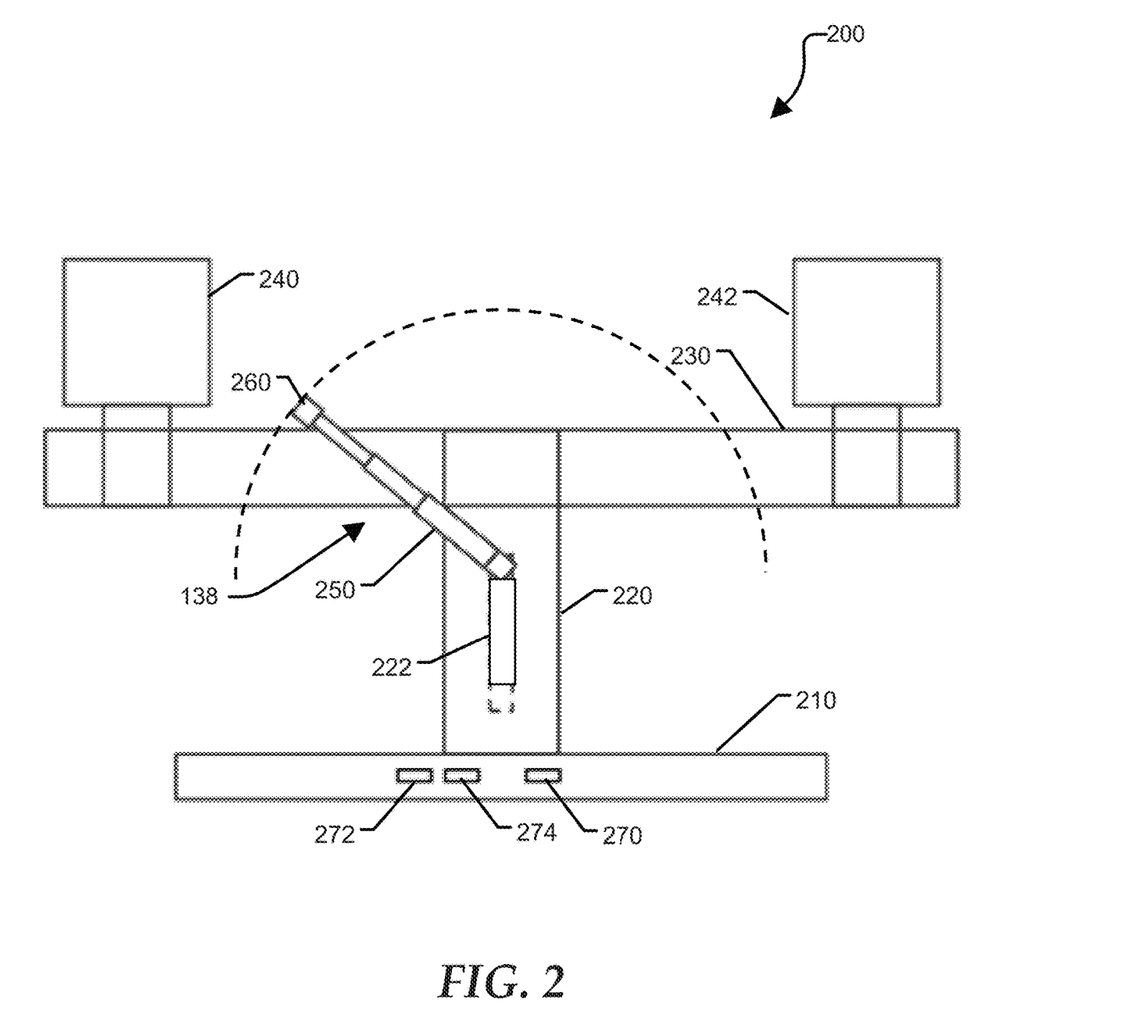
FIG. 2 is a structural diagram illustrating a monitor stand including an integral color calibration assembly according to a specific embodiment of the present disclosure.

FIG. 2 shows a monitor stand 200 including an integral color calibration assembly 138 according to a specific embodiment of the present disclosure. Monitor stand 200 includes a base 210, a vertical riser 220 attached to base 210, a horizontal portion 230 attached to the vertical riser 220, a mount adapter bracket 240, a mount adapter bracket 242, and color calibration assembly 138. Assembly 138 includes an extension arm 250 and a color calibration device 260. Base 210 can include USB interfaces 270, 272, and 274. Base 210 can include one or more clamp devices to secure monitor stand 200 to a desk, another work surface, and the like. Vertical riser 220 can include a recess or landing area for stowing extension arm 250 when calibration is not being performed. As illustrated, extension arm 250 has been retrieved from stowing location 222 at vertical riser 220. Each of mount adapters 240 and 242 are configured to attach to a respective display device such as display devices 135 and 136. Mount adapters 240 and 242 typically conform to a mechanical standard promulgated by the Video Electronics Standards Association (VESA). In an embodiment, USB interface 270 is configured to couple with information handling system 100, while USB interfaces 272 and 274 are configured to couple data from USB interface 270 to display devices 135 and 136, respectively.

Figure 3A:
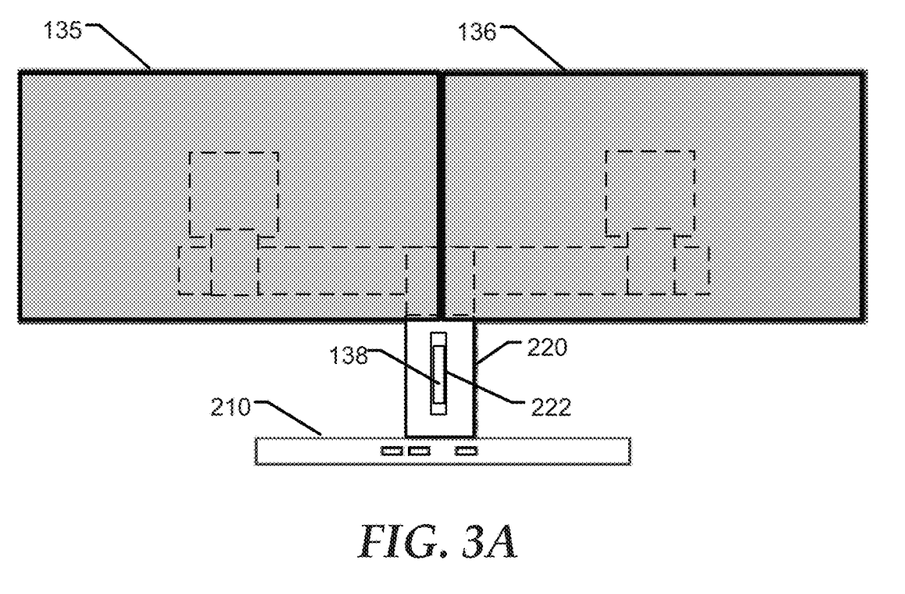
FIGS. 3A-3C include additional structural diagrams of the monitor stand of FIG. 2, according to a specific embodiment of the present disclosure.
Figure 3B:
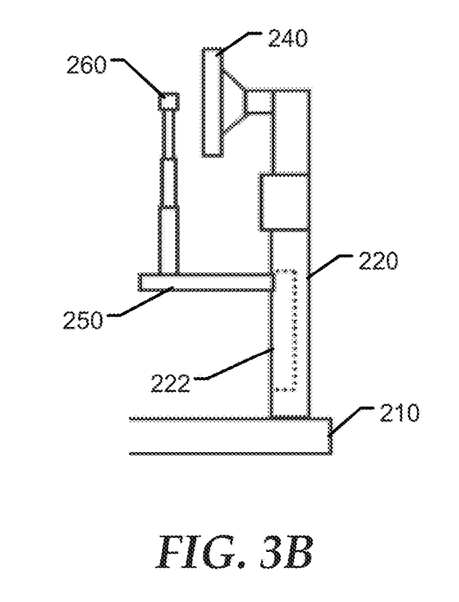
Figure 3C:
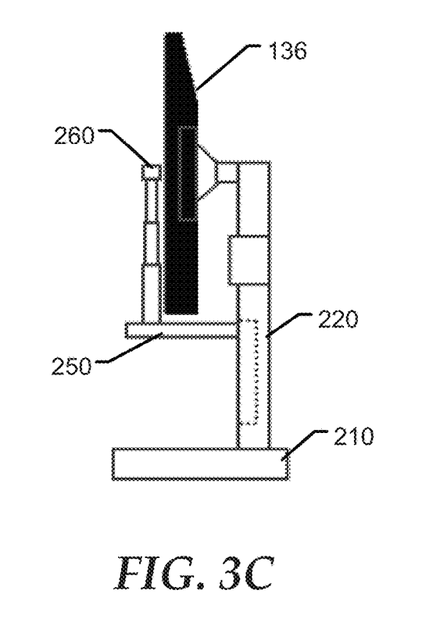

FIG. 3A shows a front view of monitor stand 200 with display devices 135 and 136 installed at stand 200. As illustrated, extension arm 250 is in a retracted position, at stowing location 222. FIG. 3B shows a side-view of stand 200 without installed display devices. FIG. 3C shows the same side-view as depicted at FIG. 3B but with the display devices installed at mount adapter brackets 240 and 242. During operation, color calibration or matching software generates a sequence of images for presentation at the display device presently being calibrated. The color calibration sensor included at color calibration device 260 determines the color actually generated by the display device and transmits this information back to information handling system 100 via USB bus 112 and interface 270 and a corresponding one of interfaces 272 and 274.

Figure 4A:
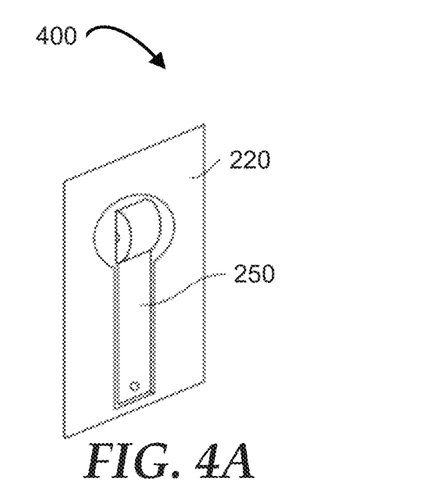
FIGS. 4A-4F include perspective views illustrating operation of the integral color calibration assembly of FIG. 2, according to a specific embodiment of the present disclosure.
Figure 4B:
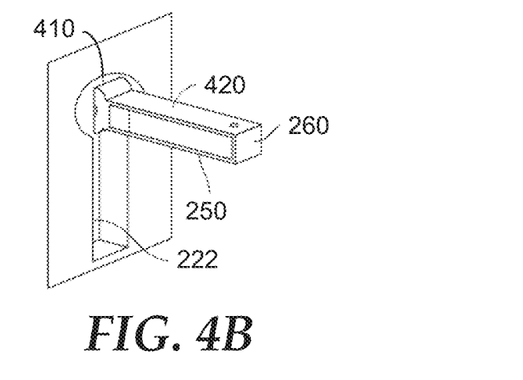
Figure 4C:
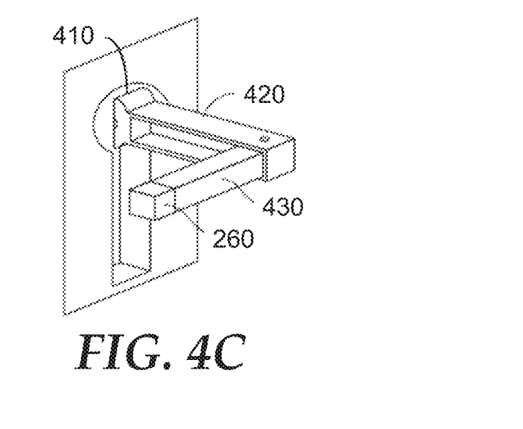
Figure 4D:
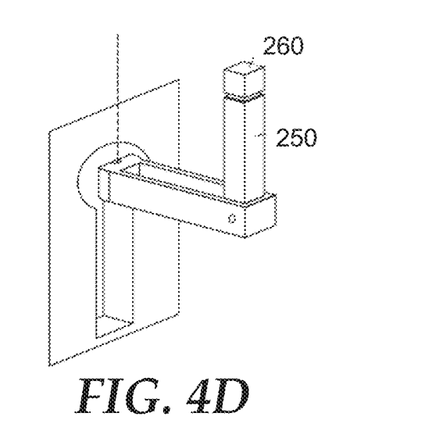
Figure 4E:
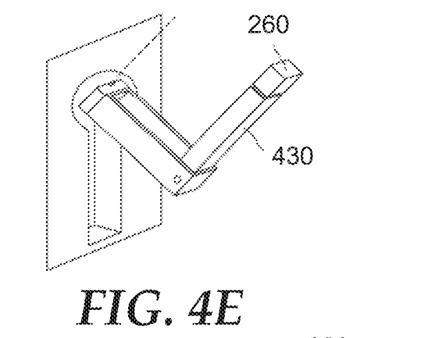
Figure 4F:
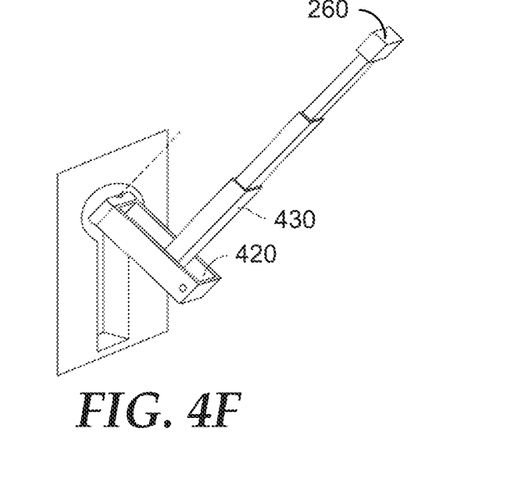

FIGS. 4A-4F show how extension arm 250 can be extended according to a specific embodiment of the present disclosure. FIG. 4A shows extension arm 250 fully collapsed and stowed at vertical riser 220. FIG. 4B shows the first stop of retracting extension arm 250. In particular, FIG. 4B shows the root end of extension arm 250, including a first portion 420 attached to vertical riser 220 using a ball joint 410. At FIG. 4C, a telescoping portion 430 of extension arm 250 is withdrawn from portion 420, exposing color calibration device 260. At FIGS. 4D and 4E, extension arm 250 is shown rotated upward about ball joint 410. At FIG. 4F, telescoping portion 430 is extended. Portion 430 can be arranged to slide laterally within portion 420 to allow for varying thickness of the display device. In an embodiment, friction, splines, or other locking mechanisms can be employed to secure ball joint 410 and the joint between portion 420 and 430 in a desired angle. Accordingly, portion 420 provides lateral displacement and telescoping portion 430 provides vertical extension for placement of calibration device 260 at the FOS of the display device that is being calibrated.

Figure 5:
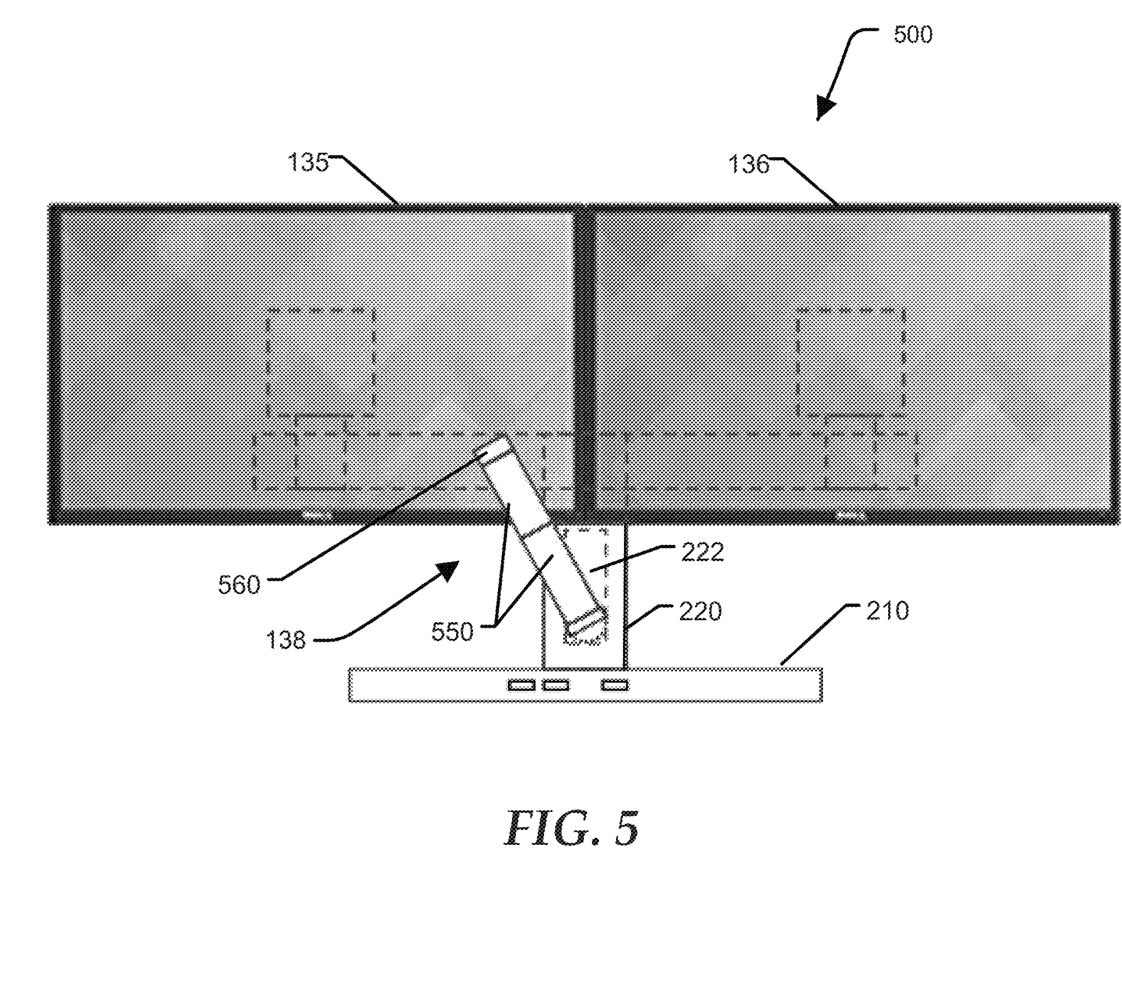
FIG. 5 is a structural diagram illustrating a monitor stand including an integral color calibration assembly according to another embodiment of the present disclosure.
Figure 6A:
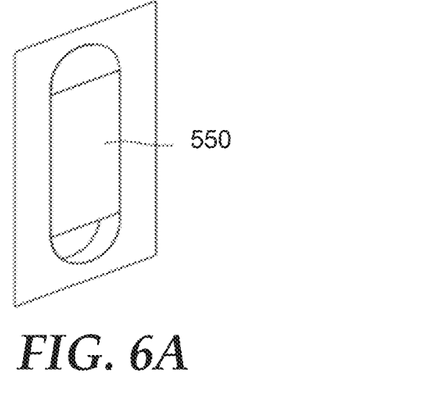
FIGS. 6A-6E include perspective views illustrating operation of the integral color calibration assembly of FIG. 5, according to a specific embodiment of the present disclosure.
Figure 6B:
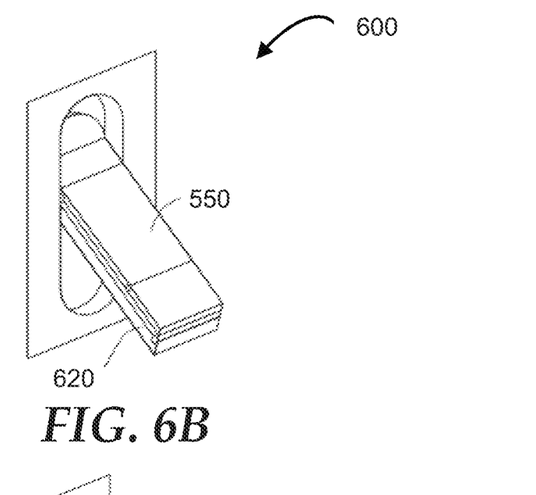
Figure 6C:
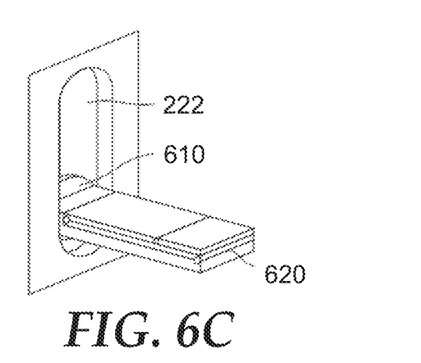

FIG. 5 shows a monitor stand 500 including an integral color calibration assembly 138 according to another embodiment of the present disclosure. Monitor stand 500 includes a base 210, a vertical riser 220, and a color calibration assembly 138. Monitor stand 500 is similar to monitor stand 200 except that color calibration assembly 138 includes folding members 550 rather than a telescoping portion for lateral and vertical displacement to position color calibration device 560 at the FOS of a selected one of display devices 135 and 136. FIGS. 6A-6E illustrate deployment of color calibration device from a stowed position at riser 220 (FIG. 6A) to a final position where a color sensor at color calibration device 560 is at the FOS of the display device that is being calibrated (FIG. 6E). At FIG. 6A, color calibration assembly 138, including a folding member 550, is in a folded position, for example stowed at recess 222 of vertical riser 220. AT FIG. 6B, assembly 138, still in a folded configuration, is shown swinging outward from riser 220. In an embodiment, the folded assembly includes a root end 610 attached to riser 220 using a ball joint and hinge mechanism that can slide up and down within recess 222 and to allow assembly 138 to pivot left and right towards a selected one of display devices 135 and 136. FIG. 6C shows the folded assembly 138 positioned at the bottom of recess 222.

Figure 6D:
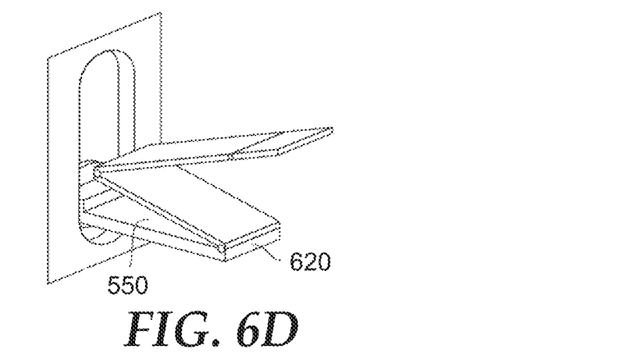
Figure 6E:
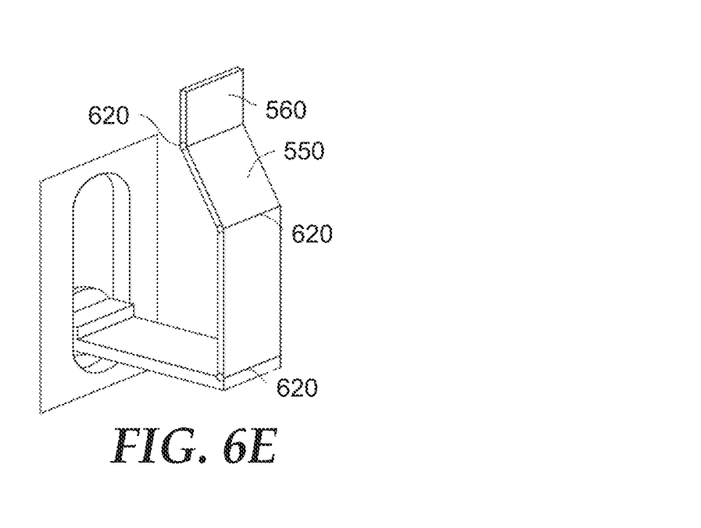

FIG. 6D shoes assembly 138 being unfolded into two or more folding members 550, each member attached to an adjacent member by a hinge-like component 620. As described above, friction, splines, or other locking mechanisms can be employed to secure root end 610 and the hinge components 620 between each folding members 550 of assembly 138 at a desired angle. At FIG. 6E, color calibration assembly is shown in a final configuration so that color calibration device 560 is in position at the FOS of the display device that is being calibrated.

Figure 7:
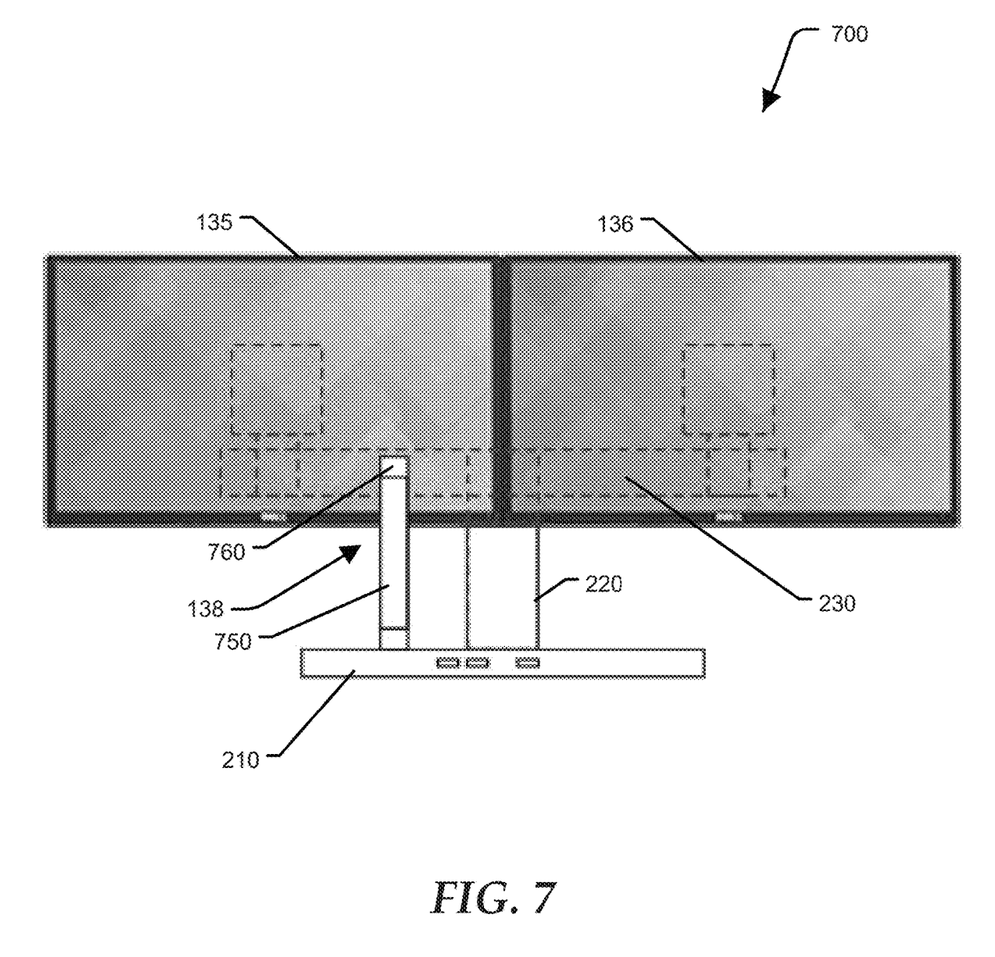
FIG. 7 is a structural diagram illustrating a monitor stand including an integral color calibration assembly according to yet another embodiment of the present disclosure.

FIG. 7 shows a monitor stand 700 including an integral color calibration assembly 138 according to still another embodiment of the present disclosure. Monitor stand 700 includes a base 210, a vertical riser 220, and a horizontal member 230 to support two or more display devices, as described above. Monitor stand 700 includes an extension arm 750 that is configured to slide horizontally within base 210 so as to align a calibration device 760 with the FOS of either display device 135 or display device 136. In an embodiment, extension arm 750 can be folded and stowed at base 210, as shown at FIGS. 8A-8D.

Figure 8A:
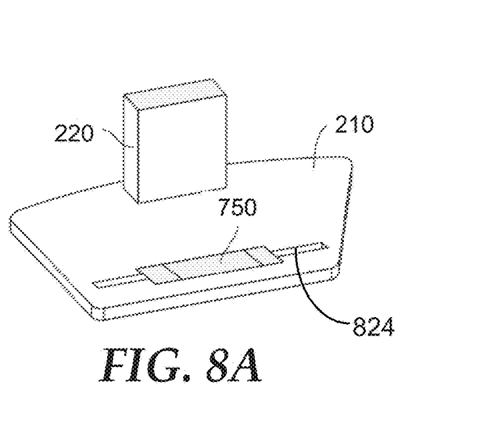
FIGS. 8A-8D include perspective views illustrating operation of the integral color calibration assembly of FIG. 7, according to a specific embodiment of the present disclosure.
Figure 8B:
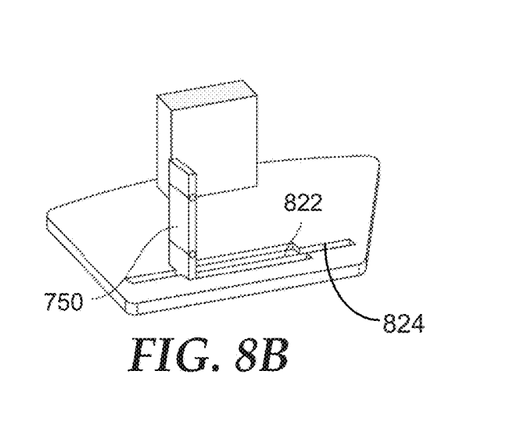
Figure 8C:
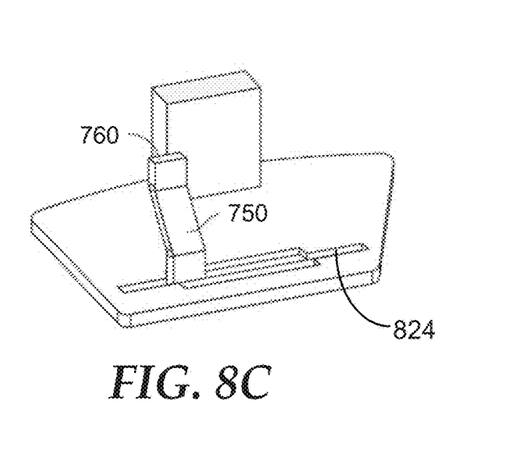
Figure 8D:
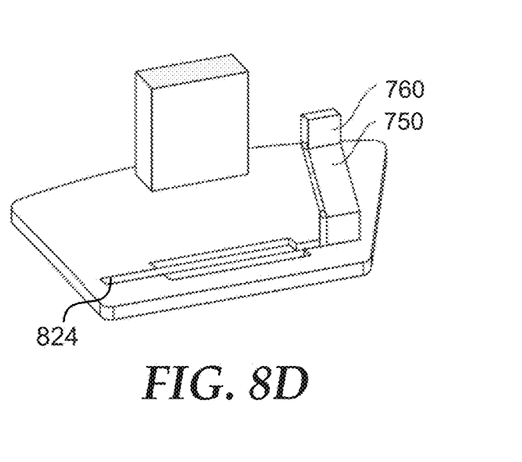

FIG. 8A shows extension arm 750 in a stowed position at base 210. At FIG. 8B, extension arm 750 is shown pivoted to a vertical orientation. For example, a root end of extension arm 750 can include a hinge device that allows for arm 750 to pivot away from a recess 822 at base 210 and into a vertical position. FIG. 8C shows how extension arm can be manipulated to position calibration device 760 at the FOS of a selected display device, for example by adjusting hinge components included at arm 750. In an embodiment, arm 750 can be configured to rotate ninety degrees from the stowed orientation, as illustrated. Base 210 includes a slot or guide component 824 that allows extension arm 750 to travel horizontally from one display device to another, as illustrated at FIGS. 8C and 8D, respectively.

Figure 9:
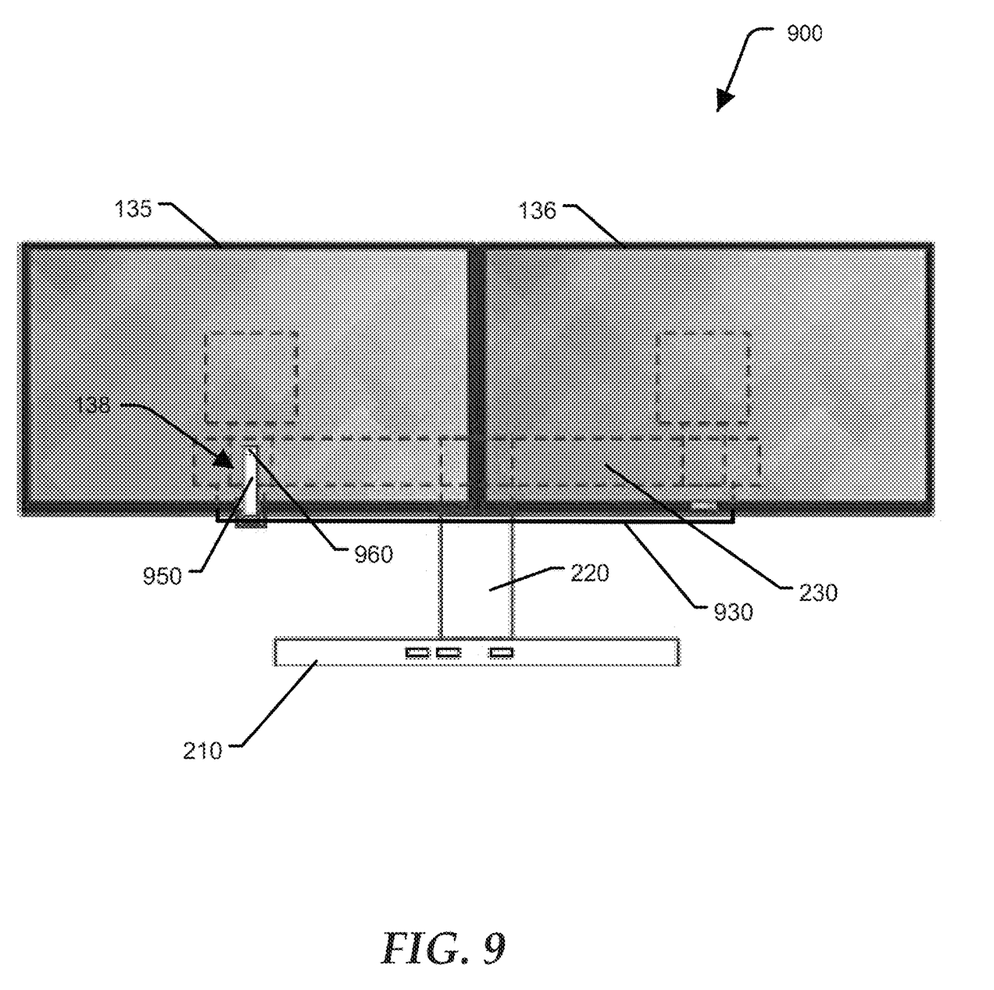
FIG. 9 is a structural diagram illustrating a monitor stand including an integral color calibration assembly according to still another embodiment of the present disclosure.

FIG. 9 shows a monitor stand 900 including an integral color calibration assembly 138 according to yet another embodiment of the present disclosure. Monitor stand 900 includes a base 210, a vertical riser 220, and a horizontal member 230 to support two or more display devices, as described above. Calibration assembly 138 includes an extension arm 950 and a color calibration device 960. In addition, stand 900 includes a rail 930 attached to horizontal member 230. Color calibration assembly 138 is configured to slide along rail 930 so that a sensor at calibration device 960 can be positioned at the FOS of either display device 135 or display device 136.

Figure 10A:
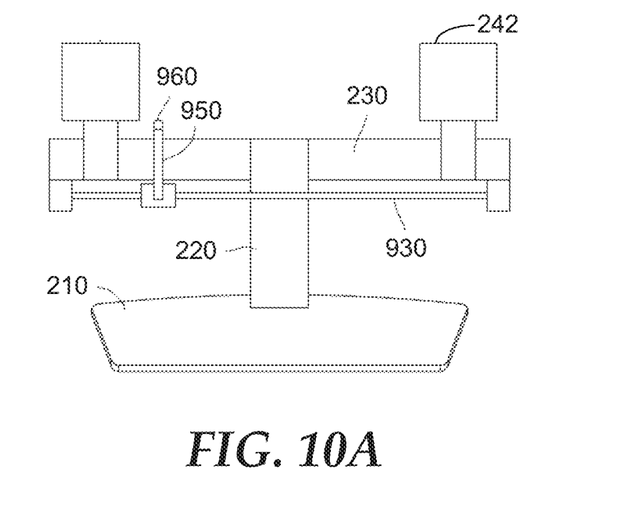
FIGS. 10A-10C include perspective views illustrating operation of the integral color calibration assembly of FIG. 9, according to a specific embodiment of the present disclosure.
Figure 10B:
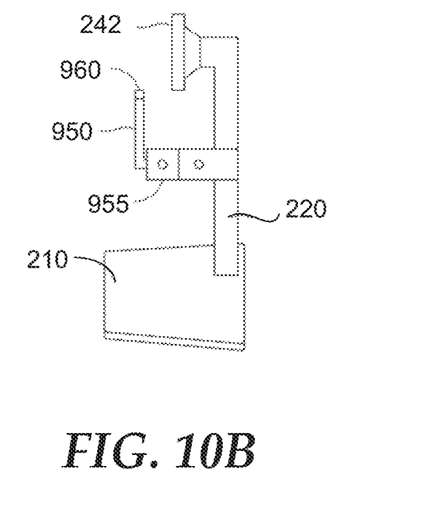
Figure 10C:
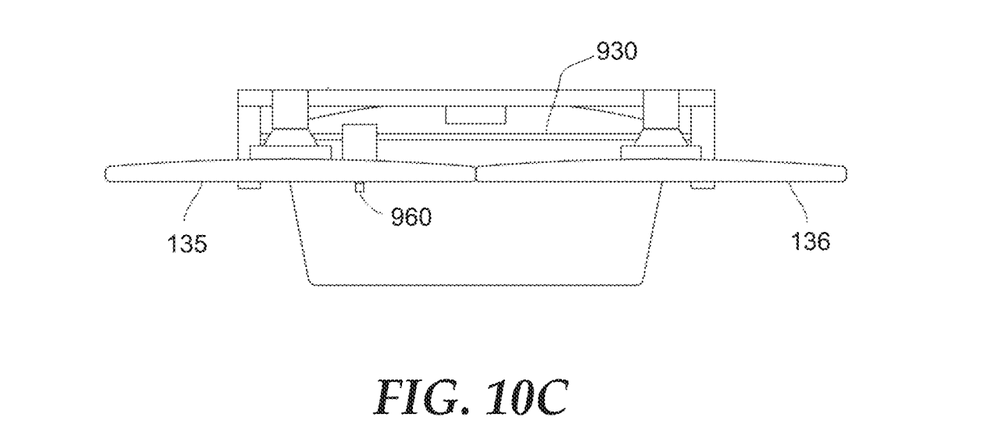

FIG. 10A shows a front view of monitor stand 900 without display devices attached to mount adapter brackets 240 and 242. FIG. 10A shows base 210, vertical riser 220, horizontal member 230 with attached rail 930, and extension arm 950 with color calibration device 960. FIG. 10B shows a side view of monitor stand 900. Extension arm 950 includes a horizontal portion 955 that positions calibration device 960 at the FOS of attached display devices. FIG. 10C shows a top view of monitor stand 900, illustrating the position of calibration device 960 in front of display device 135. Similarly to the embodiments described above, calibration assembly 138 can be configured to fold for storage when not in use. In all of the illustrated embodiments, manipulation of calibration assembly 138 can be performed by a user. Alternatively, aspects of deployment, positioning, and stowage can be automated using motors, actuators, and the like.

Figure 11:
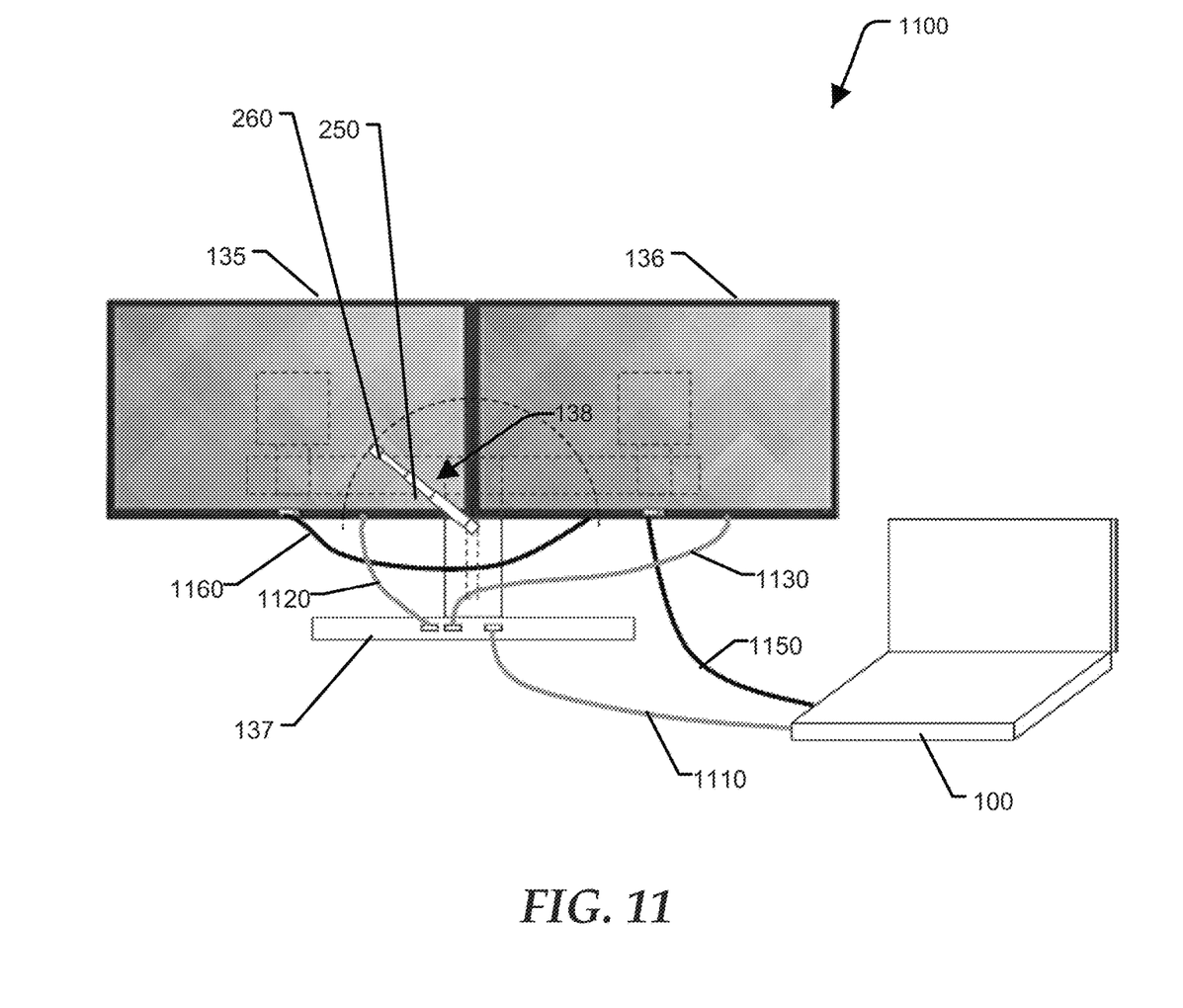
FIG. 11 is a block diagram illustrating connectivity of a monitor stand, two monitors, and an information handling system according to an embodiment of the present disclosure.

FIG. 11 shows connectivity of a monitor stand 137 and monitors 135 and 136 to an information handling system 100 according to an embodiment of the present disclosure. Monitor stand 137 includes an integral calibration assembly 138 and attached display devices 135 and 136. Calibration assembly 138 includes extension arm 250 and color calibration device 260. Information handling system 100 includes a USB interface coupled to monitor stand 137 via a USB cable 1110. Monitor stand 137 includes a USB connector to couple USB data bidirectionally between information handling system 100 and display devices 135 and 136 via USB cable 1120 and 1130, respectively. In addition, the USB interface is coupled to color calibration device 260 via a USB compliant cable (not shown at FIG. 11) internal to monitor stand 137 and extension arm 250. Information handling system 100 further includes a video interface to couple video data from system 100 to display devices 135 and 136. In an embodiment the video interface can be compliant with a multi-stream transport (MST) capability of the DisplayPort (DP) specification, wherein information handling system includes a single DP interface coupled to display device 136 via a DP cable 1150, and further couple via a daisy-chain arrangement from display device 136 to display device 135 via a second DP cable 1160.

The USB interface allows information handling system 100 to receive identification and capability information from each of display devices 135 and 136, and to receive color measurement information from color calibration device 260. In an embodiment, the USB interface can be used to provide color mapping tables to one or both of display devices 135 and 136, as appropriate based on the capabilities of the display devices. The DP interface couples video information consisting of a sequence of calibration color images from calibration software executing at information handling system 100 to a selected one of display devices 135 and 136.

Figure 12:
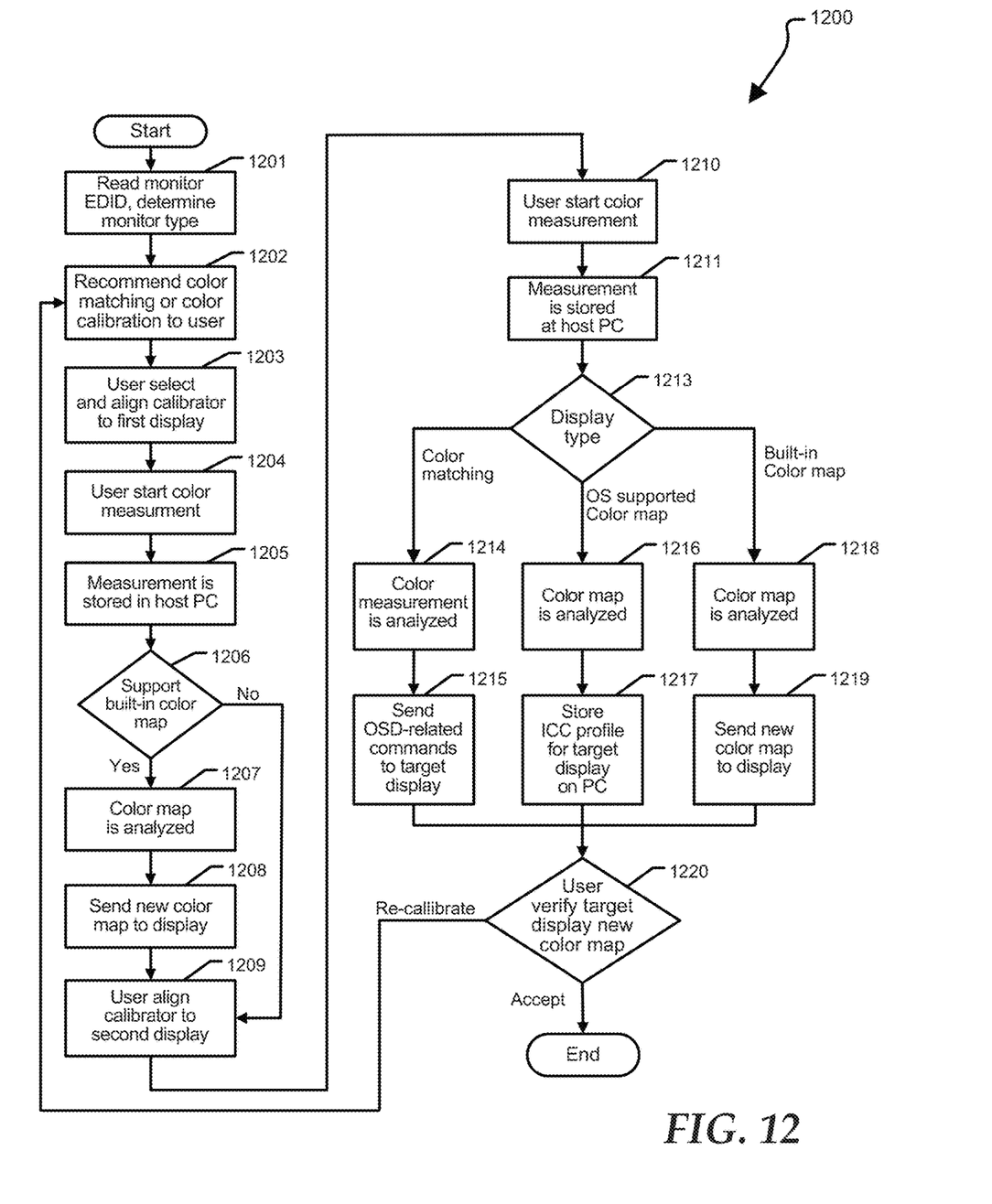
FIG. 12 is a flow diagram illustrating a method for performing color calibration of two or more display devices according to a specific embodiment of the present disclosure.

FIG. 12 shows a method 1200 for performing color calibration of two or more display devices according to a specific embodiment of the present disclosure. Method 1200 begins at block 1201 where calibration software executing at an information handling system accesses Extended Display Identification Data (EDID) metadata stored at the first display device. The EDID data structure can include manufacturer name and serial number, product type, timings supported by the display, display size, luminance data, pixel mapping data, and the like. EDID information may be retrieved from the second display device at this time. The EDID information may be accessible from the display device via one or both of a USB or a compliant graphics interface. At block 1202, the calibration software can recommend color matching or color calibration alternatives to a user, the recommendation based all or in part on the EDID information. At block 1203, the user selects and aligns a color calibrator to the first display device. For example, calibration assembly 138 can be retrieved from a docking area at monitor stand 137, extended and manipulated to place color calibration device 260 against the surface of the light-emitting portion of display device 135.

At block 1204, the calibration software initiates collection of color measurements. For example, information handling system can generate a sequence of images having intended color and luminosity, and a sensor at color calibration device 260 transmits measurements of the actual color and luminosity to the calibration software via USB interface 1110. At block 1205, the measurements are stored at information handling system 100. At decision block 1206, the calibration software determines whether the first display device supports a built-in color map. If the display is capable of storing a color map, method 1200 proceeds to block 1207 where the color map is analyzed.

At block 1208, the calibration software transmits a new color map to the first display device. The method continues at block 1209 where the user aligns the color calibrator to the second display device. Returning to decision block 1206, if the calibration software determines that the first display device does not support built-in color map, method 1200 proceeds directly to block 1209 where the user aligns the color calibrator to the second display device.

Method 1200 continues at block 1210 where the user starts color measurement at the second display device. For example, the user can manipulate extension arm 250 to place color calibration device 260 against the surface of the light-emitting portion of display device 136, and initiate color measurements, similar to measurement made at display device 135 at block 1204. At block 1211, the color measurements are stored at information handling system 100. At decision block 1213, the calibration software determines the color adjustment capabilities of the second display device based on EDID information, retrieved at the present time or previously at block 1201. The calibration software can select one of three operating modes based on the EDID information, and optionally further based on user preferences. If a color matching mode is selected, method 1200 proceeds to block 1214 where color measurements performed at block 1211 are analyzed. At block 1215, the calibration software sends OSD-related commands to the second display device to adjust color temperature, brightness, contrast, and the like.

Returning to decision block 1213, if an OS color map mode of operation is selected, method 1200 proceeds to block 1216 where the present color map is analyzed. At block 1217, the calibration software generates a new ICC profile, which is stored at information handling system 100. Returning once again to decision block 1213, if the second display device supports a built-in color map, method 1200 proceeds to block 1218 where the existing color map is analyzed. At block 1219, the calibration software generates a new color map and sends the revised color map to the second display device to be stored. Method 1200 completes at decision block 1220 where a user can either accept the color calibration results or request recalibration by returning to block 1202.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium.

A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system comprising:
   a monitor stand configured to mount a first display device and a second display device;
   an extension arm attached to the monitor stand and configured to selectively:
      position a color calibration device in contact with a light-emitting portion of the first display device;
      position the color calibration device in contact with a light-emitting portion of the second display device; and
      collapse for stowage adjacent to the monitor stand; and
   a processor to:
      control the color calibration device to determine initial color attributes of the first display device; and
      control the color calibration device to determine initial color attributes of the second display device.

2. The system of claim 1, wherein the processor is further to:
   identify image adjustment and color management capabilities of the first display device and of the second display device; and store a revised color map for the first display device and/or a revised color map for the second display device based on the identified image adjustment and color management capabilities.

3. The system of claim 1, wherein the processor is further to:
identify image adjustment and color management capabilities of the first display device and of the second display device; and
store a revised International Color Consortium (ICC) profile for the first display device and/or store a revised ICC profile for the second display device based on the identified image adjustment and color management capabilities.

4. The system of claim 1, wherein the processor is further to:
identify image adjustment and color management capabilities of the first display device and of the second display device; and
adjust image characteristics for the first display device using on-screen display commands and/or adjust image characteristics for the second display device using the on-screen display commands.

5. The system of claim 1, wherein the monitor stand further comprises:
a universal synchronous bus (USB) interface; and
signal wires to couple the color calibration device to the USB interface.

6. The system of claim 1, wherein the monitor stand further comprises:
a base portion; and
a vertical riser portion attached to the base component, wherein a root end of the extension arm is attached to the vertical riser portion.

7. The system of claim 1, wherein the monitor stand further comprises:
a base portion; and
a vertical riser portion attached to the base portion, wherein a root end of the extension arm is attached to the base portion.

8. The system of claim 1, wherein the monitor stand further comprises:
a base portion;
a vertical riser portion attached to the base portion; and
a horizontal portion attached to the vertical portion, the horizontal portion including a first mount adapter bracket to couple to the first display device and a second mount adapter bracket to couple to the second video display device, wherein a root end of the extension arm is attached to the horizontal portion.

9. The system of claim 1, wherein the monitor stand further comprises:
a universal synchronous bus (USB) interface; and
signal wires to couple information from the color calibration device to the USB interface.

10. A method comprising:
providing a monitor stand having a first mount adapter bracket to interface with a back surface of a first display device, and a second mount adapter bracket to interface with a back surface of a second display device;
providing an extension arm having a root portion attached to the monitor stand and having a free end to interface to a color calibration device, wherein the extension arm is configured to facilitate selective positioning of the color calibration device in contact with a light-emitting portion of the first display device or a light-emitting portion of the second display device, and wherein the extension arm is further configured to collapse for stowage adjacent to the monitor stand;
controlling the color calibration device to determine initial color attributes of the first display device; and
controlling the color calibration device to determine initial color attributes of the second display device.

11. The method of claim 10, further comprising:
identifying image adjustment and color management capabilities of the first display device and of the second display device; and
storing a revised color map for the first display device and/or a revised color map for the second display device based on the identified image adjustment and color management capabilities.

12. The method of claim 10, further comprising:
identifying image adjustment and color management capabilities of the first display device and of the second display device; and
storing a revised International Color Consortium (ICC) profile for the first display device and/or storing a revised ICC profile for the second display device based on the identified image adjustment and color management capabilities.

13. The method of claim 10, further comprising:
identifying image adjustment and color management capabilities of the first display device and of the second display device; and
adjusting image characteristics for the first display device using on-screen display commands and/or adjusting image characteristics for the second display device using the on-screen display commands.

14. A system comprising:
a monitor stand configured to mount a first display device and a second display device, the monitor stand including an extension arm having:
a root end attached to the monitor stand; and
a free end to interface with a color calibration device, wherein the extension arm is configured to facilitate selective positioning of the color calibration device in contact with a light-emitting portion of the first display device or a light-emitting portion of the second display device, and to collapse for stowage adjacent to the monitor stand.

15. The system of claim 14, further comprising:
color calibration software configured to:
control the color calibration device to determine initial color attributes of the first display device; and
control the color calibration device to determine initial color attributes of the second display device.

16. The system of claim 15, wherein the software is further to:
identify image adjustment and color management capabilities of the first display device and of the second display device; and
store a revised color map for the first display device and/or a revised color map for the second display device based on the identified image adjustment and color management capabilities.

17. The system of claim 15, wherein the software is further to:
identify image adjustment and color management capabilities of the first display device and of the second display device; and
store a revised International Color Consortium (ICC) profile for the first display device and/or store a revised ICC profile for the second display device based on the identified image adjustment and color management capabilities.

18. The system of claim 15, wherein the software is further to:
   identify image adjustment and color management capabilities of the first display device and of the second display device; and
   adjust image characteristics for the first display device using on-screen display commands and/or adjust image characteristics for the second display device using the on-screen display commands.

19. The system of claim 14, wherein the monitor stand further comprises:
   a universal synchronous bus (USB) interface; and
   signal wires to couple the color calibration device to the USB interface.

20. The system of claim 14, wherein the monitor stand further comprises:
   a base portion; and
   a vertical riser portion attached to the base component, wherein the root end of the extension arm is attached to the vertical riser portion.

\* \* \* \* \*